Sept. 4, 1951 W. M. SCHWEICKART 2,566,997
VARIABLE-SPEED DRIVE
Filed Aug. 20, 1946 3 Sheets-Sheet 2
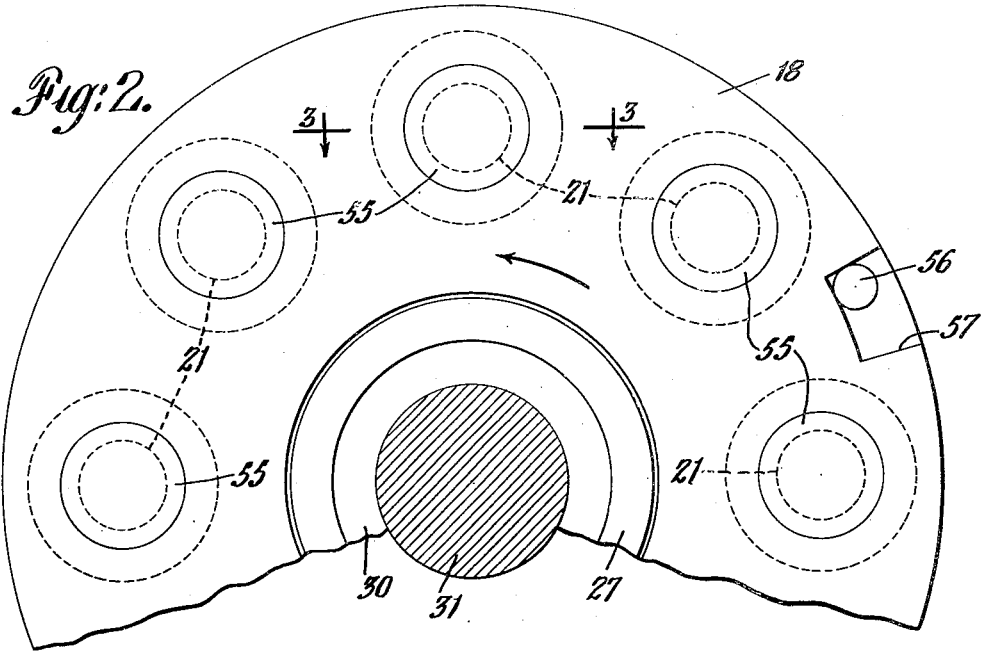
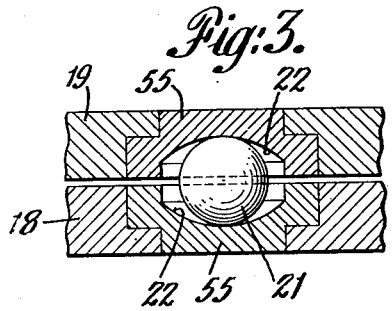
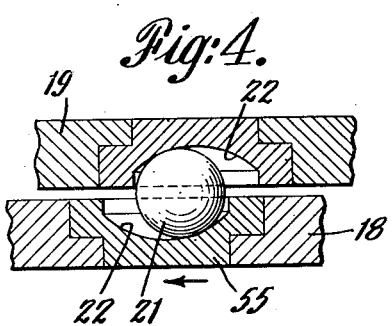
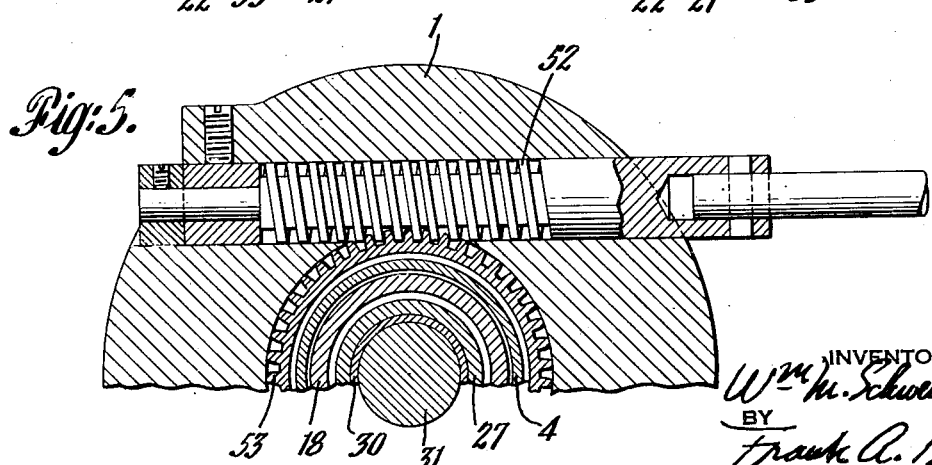
INVENTOR
Wm. M. Schweickart
BY
Frank A. Bowers
ATTORNEY

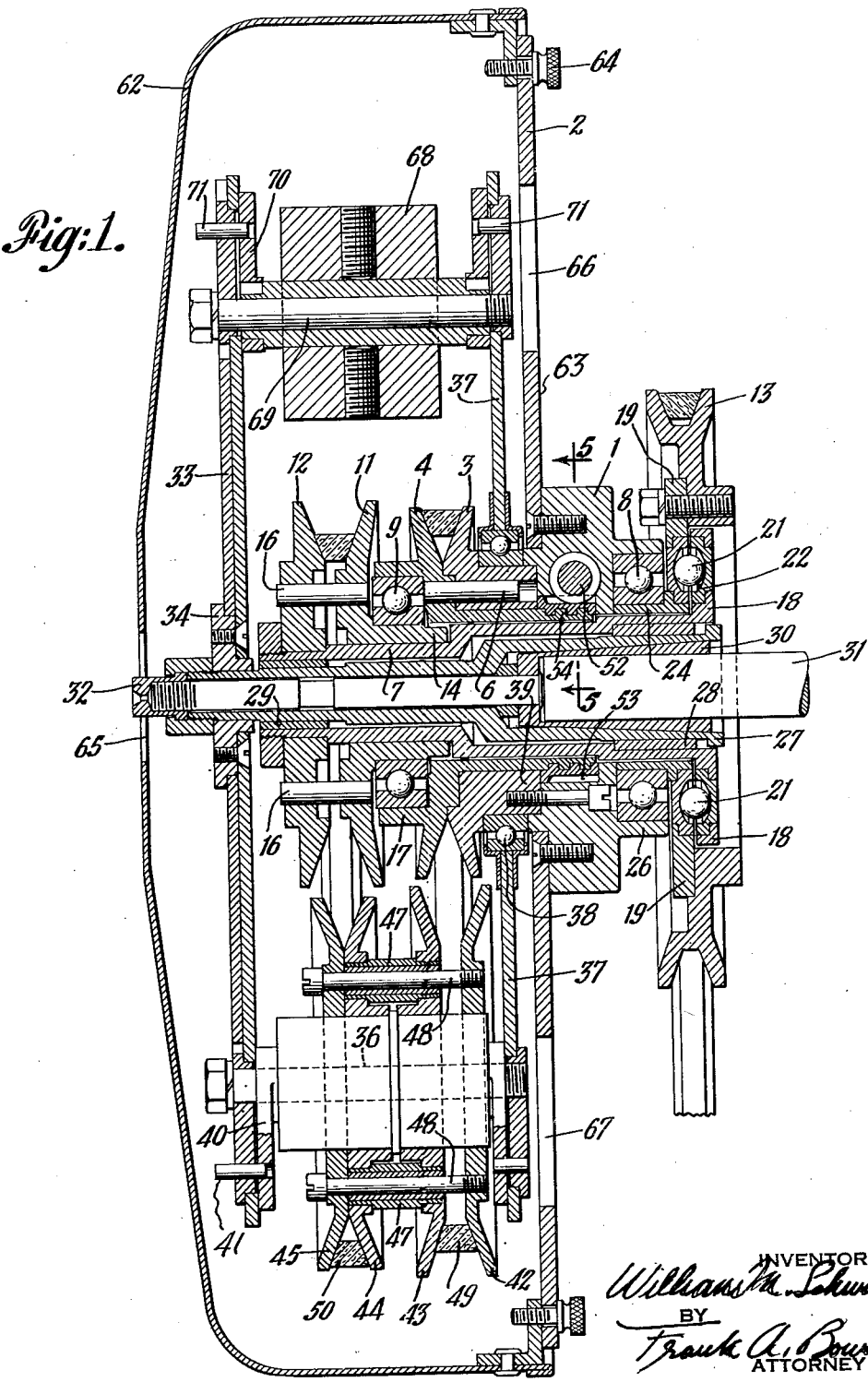

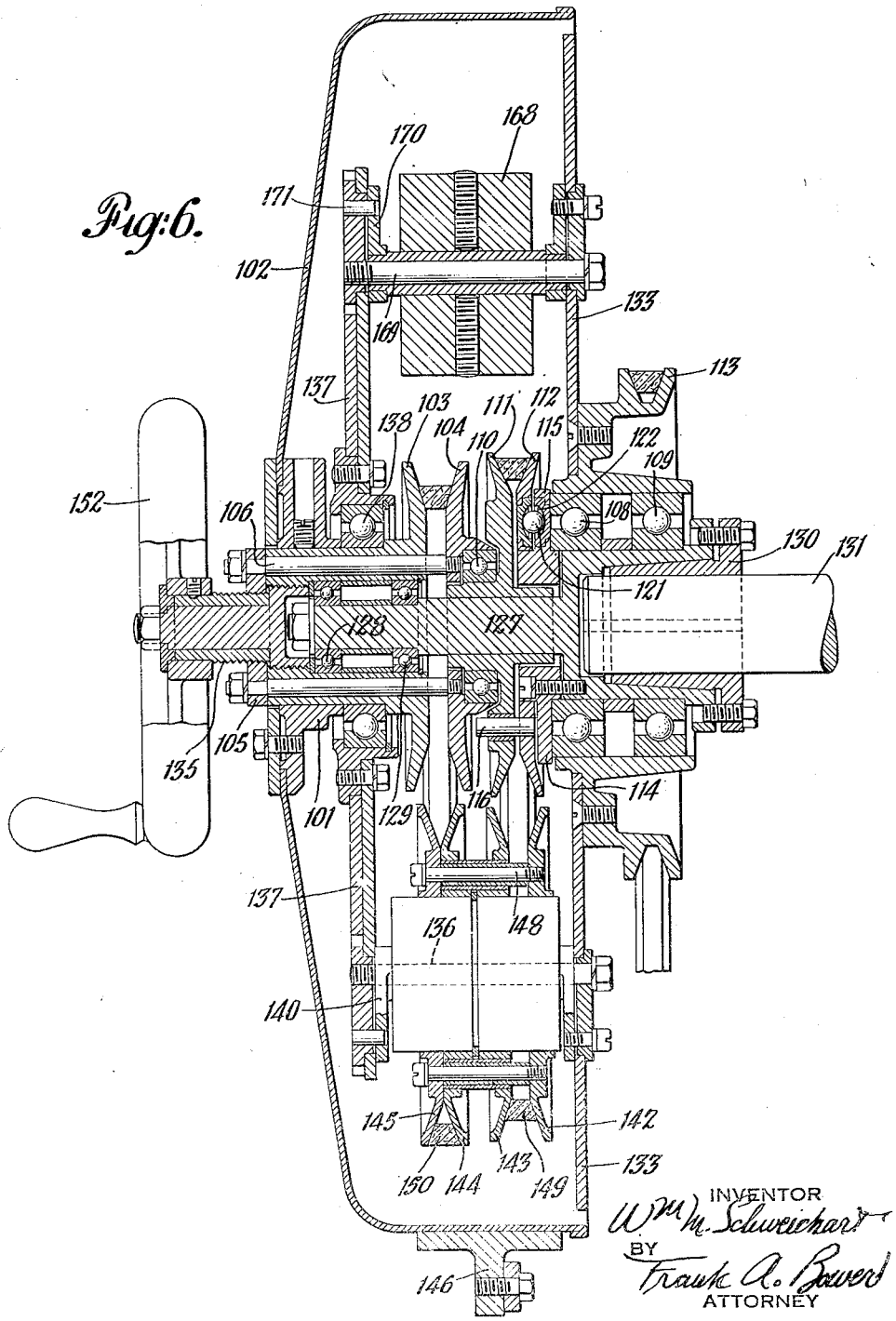

Patented Sept. 4, 1951

2,566,997

UNITED STATES PATENT OFFICE 2,566,997

VARIABLE-SPEED DRIVE

William M. Schweickart, Mentor, Ohio, assignor to Speed Selector Inc., Cleveland, Ohio, a corporation of Ohio Application August 20, 1946, Serial No. 691,812

5 Claims. (Cl. 74—793)

This invention relates to variable speed transmissions and more particularly to those of the belt driven variable speed type.

An object of the invention is to provide a variable speed transmission of the belt type which will be adaptable to various drives and dependable in maintaining each predetermined performance under the variable conditions of service.

It is a further object of this invention to provide a belt driven variable speed transmission automatically controlling the speed variation to maintain a set speed irrespective of changes in the load.

It is a further object of this invention to provide a belt driven variable speed transmission in which the ratio between input and output speeds will not be changed by a variation of the load.

These and other objects and features of this invention will become more apparent upon consideration of the description taken with the following drawings in which:

Fig. 1 is a vertical sectional view of a variable speed drive;

Fig. 2 is a partial end view of the variable speed drive as seen from the right of Fig. 1;

Fig. 3 is a horizontal sectional view taken on line 3—3 of Fig. 2;

Fig. 4 is a horizontal sectional view similar to Fig. 3 with the parts in a different position;

Fig. 5 is a partial vertical sectional view taken on line 5—5 of Fig. 1; and

Fig. 6 is a vertical sectional view of a modification of this variable speed drive.

In general, the variable speed transmission of this invention comprises a stationary support carrying two separate rotatable means connected by belts and one of which is driven by outside means and the other drives a power take-off.

With reference to Fig. 1, a hub 1 suitably supported has fastened to it a casing 2 and two discs 3, 4 of a V-pulley. The disc 4 is keyed to the disc 3 by pins 6 to permit axial but not angular motion between the discs. The hub 1 and pulley 3, 4 are formed with an annular passage through the center into which is fitted a hollow shaft 7. The shaft 7 is rotatably supported in the hub 1 and pulley 3, 4 on two bearings 8 and 9. The shaft 7 carries at one end discs 11 and 12 of a V-pulley and at the opposite end an output pulley 13. The disc 11 is slidably fitted on a portion of shaft 7 and has a bushing 14 on which the bearing 9 is seated. The disc 12 is fastened on the end of shaft 7 and connected to the disc 11 by pins 16 to permit axial but not angular displacement between the discs. The disc 11 is connected with the disc 4 to pulley 3, 4 through the bearing 9 which seats on bushings 14 and 17 of discs 11 and 4 respectively. The bearing 9 holds discs 11 and 4 as a unit axially but permits angular displacement.

On the opposite end of the shaft 7 a flange 18 is provided and engages a member 19 through steel balls 21 in pockets 22 provided in the flange 18 and the member 19. The pulley 13 is fastened to the member 19 and the bearing 8 seats on a flange 24 of the member 19. The end of the hollow shaft 7 is supported by the bearing 8 which also seats on flange 26 of the hub 1. In the hollow shaft 7 a rotatable quill 27 is mounted on bushings 28 and 29. A drive shaft 31 is wedged in the quill 27 by a collet 30 and secured by a lock nut 32 at the opposite end. The plate 33 is secured to a collar 34 fixed on the quill 27. The plate 33 carries a crank member 40 which is also supported by a plate 37. The plate 37 is rotatably supported by a bearing 38 on a shoulder 39 of the disc 3. An axle 36 of the crank 40 carries two V-pulleys composed of discs 42, 43 and 44, 45 which are rotatably mounted on the axle 36. The left disc 43 of pulley 42, 43 and the right disc 44 of the pulley 44, 45 are joined on sleeves 47 which slide on bolts 48 to which discs 42 and 45 are fastened. The entire assembly of plate 37 and 33, axle 36 and shaft 31 rotate as a unit supported by bushings 28 and 29 and bearing 38. Pulley 42, 43 is connected to pulley 3, 4 by belt 49 and pulley 44, 45 is connected to pulley 11, 12 by belt 50.

To provide adjustment of the tension on the belts 49 and 50 by moving the axle 36 either toward or away from the pulleys 3, 4 and 11, 12, the crank 40 is eccentrically pivoted in the plates 33 and 37 on pins 41 so that when the axle 36 and crank 40 turn on the pins 41 they move radially with relation to the pulleys 3, 4 and 11, 12. A counterweight 68 positioned opposite the axle 36 on an axle 69 is eccentrically pivoted in the plates 33 and 37 of a crank 70 turning on pins 71. The movement of the crank 70 on the pins 71 provides an adjustment of the counterweight 68 radially with relation to the pulleys 3, 4 and 11, 12 which may be indexed to match the adjustment of the axle 36.

The member 19 and the flange 18 are connected to steel balls 21 in pockets 22 which have inclined sides. The flange 18 on the hollow shaft 7 moves integrally with the disc 12 of the pulley 11, 12. Axial movement of the hollow shaft 7 and the flange 18 and the disc 12 increases and decreases the depth of the V in the pulley and consequently the effective diameter of the pulley for the belt 50. An end view is shown in Fig. 2 of part of the flange 18 as seen from the right of Fig. 1. Insets 55 in the flange 18 encircle the flange with steel balls 21 shown in dotted outline. A limit pin 56 on the member 19 protrudes into a slot 57 in the perimeter of the flange 18 limiting the amount of angular displacement between the output pulley 13 and the shaft 7. In a horizontal sectional view Fig. 3 shows one of the steel balls 21 in the pockets 22 when the transmission is at rest. In Fig. 4 the pockets 22 of Fig. 3 are shown moved in relation to each other as they would be if a high torque on the hollow shaft 7 caused an angular displacement between the shaft 7 and the output pulley 13. The effect of this relative motion between the pockets in the flange 18 and member 19 is to roll the steel ball 21 up the inclined sides and force the axially movable flange 18 away from the member 19 and consequently close the V of the discs 11 and 12 thereby increasing the effective diameter of the pulley 11, 12 and increasing its speed or counterbalancing a decrease in the effective diameter caused by stretching of the belts 49 and 50. As a result when an overload is placed on the output pulley 13 displacement takes place between the pulley and shaft 8 and the pulley 11, 12 tightens the belt 50 in proportion to the load placed on the transmission. This takes up any slack in the belts 50 and 49 and maintains the speed of the output pulley 13 unvaried by the torque applied.

In operation motion is applied to the transmission through the drive shaft 31 which turning the plate 33 revolves the axle around the central pulleys 3, 4 and 11, 12. A V-belt 49 connects pulley 3, 4 with stationary pulley 3; 4 causing the pulley 42, 43 to rotate on axle 36 and in turn rotate pulley 44, 45 which is bolted to it. A V-belt 50 over the pulley 44, 45 transmits the motion to pulley 11, 12 and turning hollow shaft 7 drives the output pulley 13 through the steel balls 21. The gear ratio and speed reduction obtained on passing motion through this pulley and belt arrangement depends upon the difference in the speeds of the pulleys which in turn depends on the relative effective diameters of the pulleys. The V-belts 49 and 50 passing over the pulleys exert a constant tension to separate the discs. As the discs 4 and 12, 42 and 45, 43 and 44 are fastened to move together axially the tension on the belts acts to counterbalance the separation of the discs. The speed and the direction of the output pulley 13 is determined by the relative speeds of the belts over the pulleys depending upon the sizes and angles of the pulleys and the length of the belts.

An adjustment of the discs, the position of the belts and the ratios between the pulleys is obtained by regulating a worm gear 52 turning a worm wheel 53 as shown in Fig. 5. Referring again to Fig. 1 the worm gear 52 is shown in hub 1 turning the worm wheel 53 which sliding in helical grooves 54 in an extension of disc 4 cause the disc 4 to be moved axially either left or right depending on the motion of the worm gear 52. The axial connection of the discs 4 and 11 effects adjustment of the disc 11 and the pulley 11, 12 by the worm gear 52 also. Thus moving the discs 4 and 11 to the left opens the pulley 3, 4 and decreases the effective diameter lowering the belt 49 into the pulley 3, 4 and easing the tension to permit the belt 49 to move toward pulley 42, 43 thus changing the ratio between these pulleys.

By the same adjustment the belt 50 in pulley 11, 12 is pinched outward by closing the V between discs 11 and 12 increasing the effective diameter of the pulley and increasing the tension on the belt 50 to draw it into the pulley 44, 45. The concomitant slack of belt 49 and tautness on belt 50 cooperate to move the attached discs 43 and 44 to the right increasing the effective diameter of 42, 43 and decreasing the diameter of pulley 44, 45. Thus, the ratio between pulleys 3, 4 and 42, 43 is altered in one direction and the ratio between belts 11, 12 and 44, 45 is altered in the opposite direction. As pointed out above, depending upon the sizes and angles of the pulleys and the length of the belts, the adjustment obtained by the worm gear 52 may increase or decrease the speed of the output pulley 13 or reverse it.

The casing 2 has a removable cover 62 of thin metal fastened to the plate 63 by thumb screws 64 in flanged connections for easy removal and ready access to the belts and puleys. Ventilating openings 65, 66 and 67 in cover 62 and plate 63 provide cooling by currents of air preventing undue temperature rises.

In Fig. 6 the modified structure is shown in which the applied reference numerals are 100 above the comparative figures of the numerals appearing in Figs. 1 to 5. In this Fig. 6 the stationary hub 101 is composed of an extension of a disc 103 to which is clamped a casing 102. A suitable support is provided for the hub 101 and casing 102. A disc 104 forming with disc 103 a pulley 103, 104 is fastened on pins 106 sliding in the disc 103 and permitting axial but not angular movement between the discs 103 and 104. The pins 106 are bolted to a ring 105 which is threaded on a screw 135 turned by a handwheel 152 to move the ring 105, pins 106 and disc 104 axially of the pulley 103, 104. The pulley 103, 104 is provided with a central annular passage which supports a tapering arbor 127 in bearings 128 and 129. The arbor 127 has fitted into its right end a drive shaft 131 tightened by a collet 130. A disc 111 fitted over arbor 127 slides axially on the arbor 127 and is held by disc 104 through bearing 110 to slide axially with the disc 104, but permitting angular displacement between discs 104 and 111. A ring 114 with a flanged portion 115 is fastened to the arbor 127. The ring 114 is provided with a shoulder on which a disc 112 is slidably supported to form pulley 111, 112 with the disc 111. The disc 112 is held in place by a V-belt 149 and is connected to the flange 115 through balls 121 in pockets 122. Pins 116 in disc 112 protrude through discs 111 and permit disc 111 to move axially but not angularly in relation to the disc 112. An input pulley 113 is mounted on the arbor 127 on two bearings 108 and 109. A plate 133 is fastened to the pulley 113 and a second plate 137 is carried on the hub 101 by bearing 138. The plates 133 and 137 carry crank 140 on which are rotatably mounted pulleys 142, 143 and 144, 145 on axle 136. These pulleys are connected to pulleys 103, 104 and 111, 112 by belts 149 and 150. A lug 146 on the casing 102 provides a connection with a torque arm which gives the casing increased stability.

In operation power is transmitted through this modification by being applied to the pulley 113 causing the axle 136 to revolve around the central pulleys 103, 104 and 111, 112. The pulley 144, 145 being connected to stationary pulley 103, 104 by belt 150 is caused to rotate by the revolution of the axle 136. This rotation in turn rotates the pulley 142, 143 which turns the pulley 111, 112 to which it is connected. Through the steel balls 121 the pulley 111, 112 drives the shaft 131.

Adjustment of the effective diameters of pulleys of this modification is obtained by turning the handwheel 152 and moving the discs 104, 111 axially. The steel balls 121 in inclined pockets 122 in the disc 112 and flange 115 provide a torque compensating motion when an overload is placed on the shaft 131 by utilizing the displacement of disc 112 and flange 115 to close the V of pulley 111, 112 and compensate for a change in the belts 149 and 150.

In installations where a supply of power and machine to be driven are close together it is advantageous to apply and take off the power from the same side of the transmission as shown in the described embodiments of this invention. It is also advantageous for the transmission to be compact, taking up a minimum amount of space and simple in mechanical principle to reduce required attention and repair. These advantages are found in applicant's invention as disclosed herein.

By means of the torque compensating device disclosed the application of high torque loads on the output means at very low speeds is made possible without variation in the output speed. Ordinarily where the load turned by the transmission is varied at low speeds the speed of the output rotation is correspondingly changed. The variation in speed is caused by a change in position of the V-belts in the pulleys when a greater torque is applied to the pulley as when the load on the output pulley is increased. To avoid this variation and provide a constant output uninfluenced by changes in the output force to be exerted a compensating means has been devised, an embodiment of which has been disclosed.

By the nature of the construction as the load placed on the output pulley is increased the balls 21 roll up the angular sides of the pockets 22, thus forcing the output shaft to close the V of the driven pulley. This increases the ratio between that pulley and the mating pulley on the revolving axle and also at the same time tightens the belt on those pulleys. Furthermore, if that belt is automatically tightened it also tightens the second belt connecting the other set of pulleys. The effect of this is that the belts can be run loosely under light or normal loads but as an overload is placed on the unit the belts are automatically tightened in proportion to the load placed upon the unit. Thus, it is possible to maintain a constant speed regardless of the load without the use of springs. The action of the compensating means causes the belt to ride at a higher pitch diameter in the driven pulley which has the effect of increasing the output speed. By the proper shape of the pockets the output speed remains constant for varying torque loads.

Another feature of the torque compensating means is the correcting effect compensating for the creeping of the belts on the pulleys. At low output speeds the ratio between the pulleys is only slightly greater than 1:1. Because of the normal creep in the belts the slight difference in the ratios become closer to 1:1 causing a noticeable reduction in output from no load to full load. The torque compensator automatically maintains throughout varying loads the set ratio thus maintaining substantially constant speeds under the conditions of load variation.

As above described the torque load on both sheave faces is applied to displace the compensator balls 21, the pins maintaining a fixed angular displacement of both sheave faces with relation to the mating compensator pockets 22. The sheaves of the pulley on which the torque is compensated may be angularly independent of each other so that the torque on only one sheave is utilized for angular displacement with relation to the compensator pockets and actuating the compensation.

It will also be understood that the mechanism may be altered or revised without departing from the principles of the invention as disclosed herein. It is, therefore, intended that the invention not be limited other than by the scope of the appended claims.

I claim:

1. In a variable speed belt drive the combination with a stationary casing, of a rotary sheave frame in said casing and having outer rotary sheaves spaced from the axis of said rotary frame, drive means for said frame at one side of said casing, a stationary sheave in said casing, a rotary driven sheave in said casing having relatively shiftable halves varying the pitch diameter of said sheave, a driven shaft connected to said driven sheave and coaxial with said drive means, belt connections between said stationary sheave and said outer rotary sheaves, belt connections between said outer rotary sheaves and said rotary driven sheave, said coaxial drive means and driven shaft being sleeved one within the other to extend from the same side of said variable speed drive, and means responding to variations in torque applied by said drive comprising an axially fixed disk and an axially movable disk which is connected to one half of said driven sheave and rotary means between said disks varying the axial spacing thereof and of said halves of said driven sheave to control the relative speed between the input and output.

2. In a variable speed belt drive the combination with a stationary casing of a rotary sheave frame in said casing having outer rotary sheaves spaced from the axis of said frame, a drive shaft for said frame supported in said casing and coaxial with said frame, a stationary sheave, a rotary driven sheave in said casing and coaxial with said drive, a driven disk adjacent said driven sheave and connected to an output shaft, belt connections between said stationary sheave and said outer rotary sheaves, belt connections between said outer rotary sheaves and said rotary driven sheave, matching cup-shaped recesses in opposing faces of the driven sheave and disk curving to increasing inclination at each side of the bottom of the cup and balls in said recesses actuated by variations in torque applied by said drive to ride upward along said curved surfaces and wedge said driven sheave and disk apart, shifting one of said belt connections radially in the axis of rotation of said rotary sheaves to control the relative speed between the input and output.

3. A variable speed drive comprising co-axial rotary driving and driven members one surrounding the other, a sleeve mounting forming a bearing between them at one side of said drive, a rotary supporting means co-axial with said members and on one side of said mounting and rigidly connected to said driving member, a non-rotatable support carrying a non-rotatable inner pulley co-axial with said members, a rotary inner pulley co-axial with said non-rotatable pulley and connected to said driven member, a pair of outer pulleys carried by said rotary supporting means, all of said pulleys being V-pulleys having relatively adjustable disks, belt means between the outer and inner pulleys, and means for simultaneously adjusting the pitch diameters of the inner pulleys during rotation of said supporting means to vary the relative rates of rotation of said driving and driven members.

4. A variable speed drive as set forth in claim 3 in which the rotary driven member is sleeved within the rotary driving member.

5. A variable speed drive as set forth in claim 3 in which the rotary driving member is sleeved within the rotary driven member.

WILLIAM M. SCHWEICKART.

REFERENCES CITED

The following references are of record in the file of this patent:

UNITED STATES PATENTS

| Number | Name | Date |
|---|---|---|
| 980,847 | Steinle | Jan. 3, 1911 |
| 2,030,203 | Gove | Feb. 11, 1936 |
| 2,050,358 | McElroy | Aug. 11, 1937 |
| 2,092,469 | Oslund | Sept. 7, 1937 |
| 2,155,351 | Paulus | Apr. 18, 1939 |
| 2,247,645 | Suydam | July 1, 1941 |
| 2,248,948 | Bowers | July 15, 1941 |
| 2,276,186 | Getchell | Mar. 10, 1942 |
| 2,325,649 | Batterson | Aug. 3, 1943 |
| 2,353,905 | Kelley | July 18, 1944 |
| 2,459,969 | Schweickart | Jan. 25, 1949 |

FOREIGN PATENTS

| Number | Country | Date |
|---|---|---|
| 451,716 | France | Apr. 25, 1913 |
| 568,719 | Germany | Jan. 23, 1933 |